(12) United States Patent
Fink et al.

(10) Patent No.: US 12,337,953 B2
(45) Date of Patent: Jun. 24, 2025

(54) NON-RETRACTABLE WHEEL-TYPE LANDING GEAR FOR A ROTORCRAFT

(71) Applicants: AIRBUS HELICOPTERS DEUTSCHLAND GMBH, Donauworth (DE); AIRBUS HELICOPTERS, Marignane (FR)

(72) Inventors: Axel Fink, Donauworth (DE); Reynaldo Oioli-Neto, Donauworth (DE); Didier Bertin, Marseilles (FR)

(73) Assignees: AIRBUS HELICOPTERS DEUTSCHLAND GMBH, Donauworth (DE); AIRBUS HELICOPTERS, Marignane (FR)

( * ) Notice: Subject to any disclaimer, the term of this patent is extended or adjusted under 35 U.S.C. 154(b) by 0 days.

(21) Appl. No.: 18/233,943

(22) Filed: Aug. 15, 2023

(65) Prior Publication Data

US 2024/0190557 A1 Jun. 13, 2024

(30) Foreign Application Priority Data

Dec. 8, 2022 (EP) ..................................... 22315322

(51) Int. Cl.
    *B64C 25/06* (2006.01)
    *B64C 25/60* (2006.01)

(52) U.S. Cl.
    CPC .............. *B64C 25/06* (2013.01); *B64C 25/60* (2013.01)

(58) Field of Classification Search
    CPC ......... B64C 25/04; B64C 25/06; B64C 29/00; B64C 29/02; B64C 2025/325; B64C 25/00; B64C 25/60; B64C 25/34–36
    See application file for complete search history.

(56) References Cited

U.S. PATENT DOCUMENTS 2,843,345 A * 7/1958 Sikorsky ................. B64C 25/32
    244/17.17
3,128,971 A      4/1964 Daffer
(Continued)

FOREIGN PATENT DOCUMENTS

CN      211494436 U      9/2020
EP      1951570 A1      8/2008
(Continued)

OTHER PUBLICATIONS

"3-1 Landing Gear Types", Oct. 31, 2013 (Oct. 31, 2013), pp. 1-96, XP0555336065, Washington D.C. https://web.archive.org/web/20131031205216/http://www.faa.gov/regulations_policies/handbooks_manuals/aircraft/amt_airframe_handbook/media/ama_Ch13.pdf.
(Continued)

*Primary Examiner* — Ashesh Dangol
(74) *Attorney, Agent, or Firm* — BROOKS KUSHMAN P.C.

(57) ABSTRACT

A non-retractable wheel-type landing gear for a rotorcraft, comprising: at least one wheel; a shock absorber with a circumferential direction, which is connected to the at least one wheel and comprises a shock absorber tube and a shock absorber rod telescopically mounted to the shock absorber tube; a mounting arm extending laterally from the shock absorber tube, the mounting arm being integrally formed with the shock absorber tube and adapted for attachment to a first fitting of a rotorcraft; and a link fixation extending laterally from the shock absorber tube, the link fixation being arranged in the circumferential direction of the shock absorber at an angle in a range from 45° to 120° with respect to the mounting arm and adapted for connection to a second fitting of the rotorcraft.

20 Claims, 4 Drawing Sheets

(56) References Cited

U.S. PATENT DOCUMENTS

| | | | |
|---|---|---|---|
| 3,547,425 A | 12/1970 | Wachenheim | |
| 3,954,232 A | 5/1976 | Harper | |
| 4,345,727 A | 8/1982 | Brown et al. | |
| 5,060,886 A | 10/1991 | Davis et al. | |
| 2006/0237584 A1* | 10/2006 | Hinton | B64C 25/10 244/102 R |
| 2009/0014582 A1 | 1/2009 | De Ruffray et al. | |
| 2011/0147518 A1* | 6/2011 | Nannoni | B64C 25/14 244/102 A |
| 2021/0039774 A1 | 2/2021 | Isaac et al. | |
| 2023/0278701 A1* | 9/2023 | Brand | B64C 25/36 244/103 R |

FOREIGN PATENT DOCUMENTS

| | | |
|---|---|---|
| EP | 2319760 A1 | 5/2011 |
| EP | 3112254 A1 | 1/2017 |
| GB | 580038 A | 8/1946 |
| GB | 2218387 A | 11/1989 |
| WO | 2007057401 A1 | 5/2007 |

OTHER PUBLICATIONS

European Search Report for European Application No. EP 22315322.2, Completed by the European Patent Office, Dated Apr. 27, 2023, 11 pages.

\* cited by examiner

NON-RETRACTABLE WHEEL-TYPE LANDING GEAR FOR A ROTORCRAFT

CROSS-REFERENCE TO RELATED APPLICATIONS

This application claims priority to European patent application No. EP 22315322.2 filed on Dec. 8, 2022, the disclosure of which is incorporated in its entirety by reference herein.

TECHNICAL FIELD

The disclosure is related to a non-retractable wheel-type landing gear for a rotorcraft. The disclosure is further related to a rotorcraft comprising such a non-retractable wheel-type landing gear.

BACKGROUND

In general, rotorcrafts are either provided with retractable or partially retractable landing gears, or with fixed, i.e., non-retractable landing gears. Retractable or partially retractable landing gears are usually embodied as wheel-type landing gears, while fixed, i.e., non-retractable landing gears are usually embodied as both skid-type landing gears or wheel-type landing gears.

Use of either a wheel-type landing gear or a skid-type landing gear for a given rotorcraft mostly depends on a respective size and weight of the given rotorcraft. More particularly, wheel-type landing gears are usually implemented with larger, i.e., medium-to-heavy rotorcrafts in order to allow for an improved ground handling of such larger rotorcrafts, while smaller, i.e., light-to-medium rotorcrafts are usually implemented with skid-type landing gears.

More specifically, a wheel-type landing gear of a conventional rotorcraft may either have a so-called tricycle-type layout or, less frequently, a so-called quadricycle-type layout. The tricycle-type layout is intended to enable resting of a given rotorcraft on three separate landing gears and refers to a configuration with either a single nose-wheel landing gear or a single tail-wheel landing gear. The single nose-wheel landing gear configuration, which is currently most used, features a single landing gear provided in a nose fuselage section of a given rotorcraft and two main landing gears provided in a rear fuselage section of the given rotorcraft. The single tail-wheel landing gear configuration, instead, features a single landing gear provided in a tail section of a given rotorcraft and two main landing gears provided in a front section of the given rotorcraft. In both configurations, each one of the two main landing gears is positioned on a respectively associated lateral side of the given rotorcraft for providing sufficient stability on ground.

If a given wheel-type landing gear is retractable or partially retractable, its nose/tail and main landing gears are totally or partially housed in forward flight operation of a given rotorcraft within associated landing gear compartments in order to substantially reduce a respective aerodynamic drag of the given rotorcraft, hence, enabling an increased flight speed while reducing fuel consumption and allowing for larger flight ranges. However, in contrast to fixed-wing applications the associated landing gear compartments of the given rotorcraft are usually not closed by trap doors in the forward flight operation, since an improvement of the respective aerodynamic drag that would be associated with closed trap doors does not prevail over an additional weight of such trap doors and their associated kinematics.

Nevertheless, in any case a respectively required retraction capability of the given wheel-type landing gear already results in an increase of design complexity of the given wheel-type landing gear and its kinematics and requires a comparatively large storage volume either within the fuselage, hence, reducing available usable volume in the fuselage, or within a lateral protruding so-called sponson, hence, at least partially penalizing obtainable aerodynamic advantages of the respectively required retraction capability. Furthermore, a respective need for actuation, which is usually either electric or hydraulic, with its control and harnesses associated to retraction/expansion result in a weight increase of the given wheel-type landing gear and must be evaluated carefully against obtainable aerodynamic advantages.

However, as a general rule retractable or partially retractable wheel-type landing gears are deemed advantageous in terms of overall operational performance for fast rotorcrafts. Illustrative retractable or partially retractable wheel-type landing gears are described in the documents EP 1 951 570 A1, EP 3 112 254 A1, U.S. Pat. No. 3,954,232 A, and US 2021/0039774 A1.

Nevertheless, the simplicity and robustness, the compactness as well as the reduced weight of fixed, i.e., non-retractable wheel-type landing gears may lead to improved singular operational performances with larger useable volumes, larger payloads and less need for maintenance. Illustrative non-retractable wheel-type landing gears are described in the documents U.S. Pat. Nos. 2,843,345, 3,128,971, 3,547,425, and 5,060,886.

More specifically, an important requirement for fixed, i.e., non-retractable wheel-type landing gears is linked to an underlying attachment design which should be developed in a way to avoid the non-retractable wheel-type landing gear of being subjected to a respective overall elastic behavior of a given rotorcraft. This is especially the case with nose landing gears and main landing gears of non-retractable wheel-type landing gears, which are housed within an internal perimeter of the rotorcraft's fuselage rather than being installed within an external protruding sponson. However, respective attachments designs for such nose landing gears and main landing gears should be developed in a way to reduce as much as possible respective interface loads by ensuring an adequate basis for moment reactions and to ensure a good accessibility to respective fixation parts for inspection and disassembly in a repair scenario.

Usually, nose landing gears and main landing gears of non-retractable wheel-type landing gears comprise a shock absorber connected to one or more associated wheels, the shock absorber including a static shock absorber tube and a slidable shock absorber cylinder or rod which is telescopically mounted to the shock absorber tube. A conventional attachment design for attachment of such nose landing gears and main landing gears to a given rotorcraft involves clamping a respective shock absorber within a single interface plane to the given rotorcraft's fuselage or airframe structure by using at least three thick tension bolts. Other designs, especially for arrangements outside the fuselage perimeter, feature a truss framework built up of a set of struts and beams.

SUMMARY

It is an object of the present disclosure to provide a new fixed, i.e., non-retractable wheel-type landing gear and, more particularly, a main landing gear that provides for an improved weight efficiency and a decreased required installation volume in an associated rotorcraft. Furthermore, the new fixed, i.e., non-retractable wheel-type landing gear and, more particularly, main landing gear should be suitable for providing improved reaction load paths into an associated fuselage of the rotorcraft and simplified exchangeable attachment fittings which allow a comparatively good accessibility to respective fixations.

This object is solved by a non-retractable wheel-type landing gear for a rotorcraft. More specifically, the non-retractable wheel-type landing gear for a rotorcraft comprises at least one wheel, a shock absorber, a mounting arm, and a link fixation. The shock absorber has a length axis and a circumferential direction, and is connected to the at least one wheel. The shock absorber comprises a shock absorber tube and a shock absorber rod telescopically mounted to the shock absorber tube. The mounting arm extends laterally from the shock absorber tube and is integrally formed with the shock absorber tube, and adapted for attachment to a first fitting of a rotorcraft. The link fixation extends laterally from the shock absorber tube and is arranged in the circumferential direction of the shock absorber at an angle in a range from 45° to 120° with respect to the mounting arm, and adapted for connection to a second fitting of the rotorcraft.

The non-retractable wheel-type landing gear is preferably provided for rigid attachment in a lower lateral fuselage compartment of a rotorcraft, from which the non-retractable wheel-type landing gear preferentially extends essentially outward and through an associated opening. Thus, an excellent accessibility to all components of the non-retractable wheel-type landing gear in the lower lateral fuselage compartment may be guaranteed. Furthermore, a comparatively compact design of the non-retractable wheel-type landing gear enables minimization of a required housing volume within the lateral inner fuselage or airframe perimeter of the rotorcraft, as well as minimization of a respective shell cut-out required for landing gear integration, thus, leading to an increase of useable volume within the fuselage or airframe.

Advantageously, the non-retractable wheel-type landing gear according to the present disclosure exhibits an improved design and attachment principle which is particularly, but not exclusively, suitable for application to a main landing gear. The improved design and attachment principle provides for an easy substantiation of each attachment point and associated attachment elements, such as lugs and fittings, due to functional separation, as well as for an improved exchangeability of the fittings in case of damage and required exchange. Furthermore, the improved design and attachment principle provides for overall isostatic characteristics in order to avoid the non-retractable wheel-type landing gear being subjected to an overall elastic behavior of a rotorcraft to which the non-retractable wheel-type landing gear is attached, and to allow for a tolerance-free landing gear integration.

The at least one non-retractable wheel-type landing gear outstands by its overall simplicity with a compact, simple and light weight shock absorber. The shock absorber is essentially composed of the shock absorber rod and the shock absorber tube with the integrally formed and laterally extending mounting arm provided on an uppermost extremity of the shock absorber tube. The shock absorber tube is further provided in a lower region with lugs for attaching an associated X-link as well as an associated Y-link and advantageously exhibits an improved compatibility with standard forging techniques. Thus, the shock absorber enables attachment at two different attachment levels: a first or upper attachment level located on the uppermost extremity of the shock absorber tube, and a second or lower attachment level located at the lower region of the shock absorber tube. Accordingly, the shock absorber tube of the shock absorber forms a fixed, i.e., static attached part of the shock absorber and the shock absorber rod forms a movable part that may travel in the shock absorber tube during stroke.

At this point, it should be noted that the terms "X-link" and "Y-link" are intended to indicate extensions and orientations of links in a three-dimensional space with associated x-, y-, and z-axes, which are also referred to hereinafter as "the global directions". Transposed to a rotorcraft, the x-axis or x-direction corresponds to a longitudinal axis of the rotorcraft, the y-axis or y-direction to its transverse axis and the z-axis or z-direction to its height axis. Accordingly, the X-link is a link that extends in a given rotorcraft along (or parallel to) its longitudinal axis, and the Y-link is a link that extends in the given rotorcraft along (or parallel to) its transverse axis.

More specifically, the upper attachment level is formed by the laterally extending mounting arm which implements an upper main hinge when being attached to an associated fitting of a given rotorcraft. In the given rotorcraft, the mounting arm is preferably laterally oriented towards an inside of the given rotorcraft. The upper main hinge may represent a single fixation point and is preferably designed to react forces in all three global directions. The upper fixation point may e.g., be designed as a single bolt bushed lug connection, with a universal connection or with a spherical bearing. The upper main hinge forms an upper main hinge axis that may at least approximately be oriented in x-direction.

In a given rotorcraft, the upper main hinge is preferably arrangeable close to a longeron, i.e., an internal longitudinal main structural element of the fuselage or airframe of the given rotorcraft, essentially arranged within a x-z-plane of the given rotorcraft, and a cabin floor, i.e., an internal horizontal main structural element of the fuselage or airframe of the given rotorcraft, essentially arranged within the x-y-plane of the given rotorcraft. The exact position of the upper main hinge may advantageously be defined such that main load vectors of respective reaction loads pass close to an intersection line of the cabin floor and the longeron, hence, minimizing parasitic bending on an associated main fitting to which the upper main hinge is attached to. Respective vertical loads are, hence, directly introduced into the longeron as main load carrying structural element of the fuselage or airframe without loading side shells of the given rotorcraft.

The lower attachment level, in turn, is formed by the X-link and the Y-link which essentially work in two independent directions perpendicular to each other. The Y-link, which preferably comprises a triangular shape, and the X-link, which preferably comprises a linear shape, are essentially oriented in Y and X direction respectively, however, the Y-link and the X-link might exchange their shapes. Although the Y-link and the X-link are preferably arranged perpendicular with respect to each other, a respective angle between them may more generally be within the range of 45° to 120°.

More particularly, the X-link may be formed as a longitudinal element with one fixation point at each extremity, wherein one fixation point is attached to the shock absorber tube whereas the other fixation point is attachable to a fuselage or airframe of a given rotorcraft. The Y-link may be formed as a triangular element with one fixation point at one extremity, and two fixation points at the other extremity. The one fixation point is attachable to a fuselage or airframe of a given rotorcraft, and the two fixation points are attached to the shock absorber tube, thus, being able to transfer two independent load components into the fuselage or airframe. Furthermore, the two attachment points form a hinge axis such that the Y-link is able to rotate about that hinge axis. Accordingly, the Y-link may react torsion loads of the non-retractable wheel-type landing gear.

Furthermore, in a stroked position of the non-retractable wheel-type landing gear, a ground contact point of the at least one wheel of the non-retractable wheel-type landing gear, the upper main hinge and the link fixation of the X-link may be arranged on a virtual connecting line. As a result, no torque must be transferred to the fuselage or airframe of a given rotorcraft, to which the non-retractable wheel-type landing gear is attached, and a respective transverse load of the Y-link, i.e., a X-load component, is reduced to a minimum.

Preferably, the Y-link and the X-link are connectable to the lower shell of a given rotorcraft, i.e., to lowermost portions of the fuselage shell of the given rotorcraft by means of associated fittings. The Y-link and the X-link may be oriented essentially tangential to the corresponding shell portions they are attached to, i.e., the lower shell of the given rotorcraft, thus, avoiding any parasitic loading.

In other words, the upper attachment level is located in a given rotorcraft to which the non-retractable wheel-type landing gear is attached close to the cabin floor, whereas the lower attachment level is located close to the lower shell. Accordingly, in the given rotorcraft the upper and lower attachment levels are advantageously spaced apart over a largest available spanning distance in a respective subfloor region to react moments about the x-axis and the y-axis which are associated to the most demanding load cases arising from large longitudinal and transverse wheel contact loads. The spanning distance is limited by the distance between the lower shell of the fuselage or airframe of the given rotorcraft and the floor level of the cabin floor within the fuselage or airframe. More specifically, the spanning distance—the basis—results from a respective distance between the upper main hinge and the X-link and the Y-link, such that the shock absorber works as a cantilever beam supported at the upper main hinge and the X-link and the Y-link in two different planes, i.e., the x-z-plane and the y-z-plane). Maximizing the basis leads to a reduction of respective interface loads and to an increase of a provided landing gear stiffness.

According to some preferred embodiments, the link fixation of the non-retractable wheel-type landing gear is integrally formed with the shock absorber tube and provided for attachment to a linear link component adapted for linking the shock absorber tube to the second fitting of the rotorcraft.

According to some preferred embodiments, the non-retractable wheel-type landing gear further comprises another link fixation extending laterally from the shock absorber tube, the other link fixation being arranged in the circumferential direction of the shock absorber at an angle in a range from 45° to 120° with respect to the link fixation and adapted for connection to a third fitting of the rotorcraft.

The other link fixation may be integrally formed with the shock absorber tube and provided for attachment to a triangular link component adapted for linking the shock absorber tube to the third fitting of the rotorcraft.

The link fixation and the other link fixation may span a horizontal plane that is positioned at an angle in a range from 80° to 100° with respect to the length axis of the shock absorber.

Furthermore, the mounting arm and the other link fixation may span a vertical plane that is oriented at least approximately perpendicular to the horizontal plane.

According to some preferred embodiments, the shock absorber tube comprises a closed end and an axially opposed open end, wherein the mounting arm is provided close to the closed end, and wherein the link fixation is provided close to the open end.

According to some preferred embodiments, the shock absorber tube comprises a closed end and an axially opposed open end, wherein the mounting arm is provided close to the closed end, and wherein the link fixation and the other link fixation are provided close to the open end.

The other link fixation may form a hinge axis that is at least approximately arranged perpendicular to the mounting arm.

According to some preferred embodiments, the mounting arm is rigidly attachable via a single hinge to a single attachment point provided on the first fitting of the rotorcraft, wherein the single hinge forms a single hinge axis that is at least approximately arranged perpendicular to the mounting arm.

The hinge axis and the single hinge axis are preferably at least approximately arranged in parallel.

The present disclosure further relates to a rotorcraft comprising at least one non-retractable wheel-type landing gear and a fuselage forming a cabin with a cabin floor, the fuselage comprising a lower shell, a side shell, and at least one lateral longeron which together delimit at least one lower lateral fuselage compartment with an opening. The at least one non-retractable wheel-type landing gear is rigidly attached in the at least one lower lateral fuselage compartment and extends at least partly through the opening, and comprises at least one wheel, a shock absorber with a length axis and a circumferential direction, a mounting arm extending laterally from the shock absorber tube, and a link fixation. The shock absorber is connected to the at least one wheel and comprises a shock absorber tube and a shock absorber rod telescopically mounted to the shock absorber tube. The mounting arm is integrally formed with the shock absorber tube and rigidly attached to a first fitting mounted to the cabin floor and the at least one lateral longeron. The link fixation extends laterally from the shock absorber tube and is arranged in the circumferential direction of the shock absorber at an angle in a range from 45° to 120° with respect to the mounting arm and rigidly attached via a linear link component to a second fitting mounted to the lower shell of the rotorcraft.

Preferably, the at least one non-retractable wheel-type landing gear further comprises another link fixation extending laterally from the shock absorber tube. The other link fixation is arranged in the circumferential direction of the shock absorber at an angle in a range from 45° to 120° with respect to the link fixation and rigidly attached via a triangular link component to a third fitting mounted to the lower shell of the rotorcraft.

The triangular link component may be arranged tangentially to the lower shell.

Alternatively, or in addition, the linear link component may be arranged tangentially to the lower shell.

BRIEF DESCRIPTION OF THE DRAWINGS

Preferred embodiments of the disclosure are outlined by way of example in the following description with reference to the attached drawings. In these attached drawings, identical or identically functioning components and elements are labeled with identical reference numbers and characters and are, consequently, only described once in the following description.

DETAILED DESCRIPTION

Figure 1:
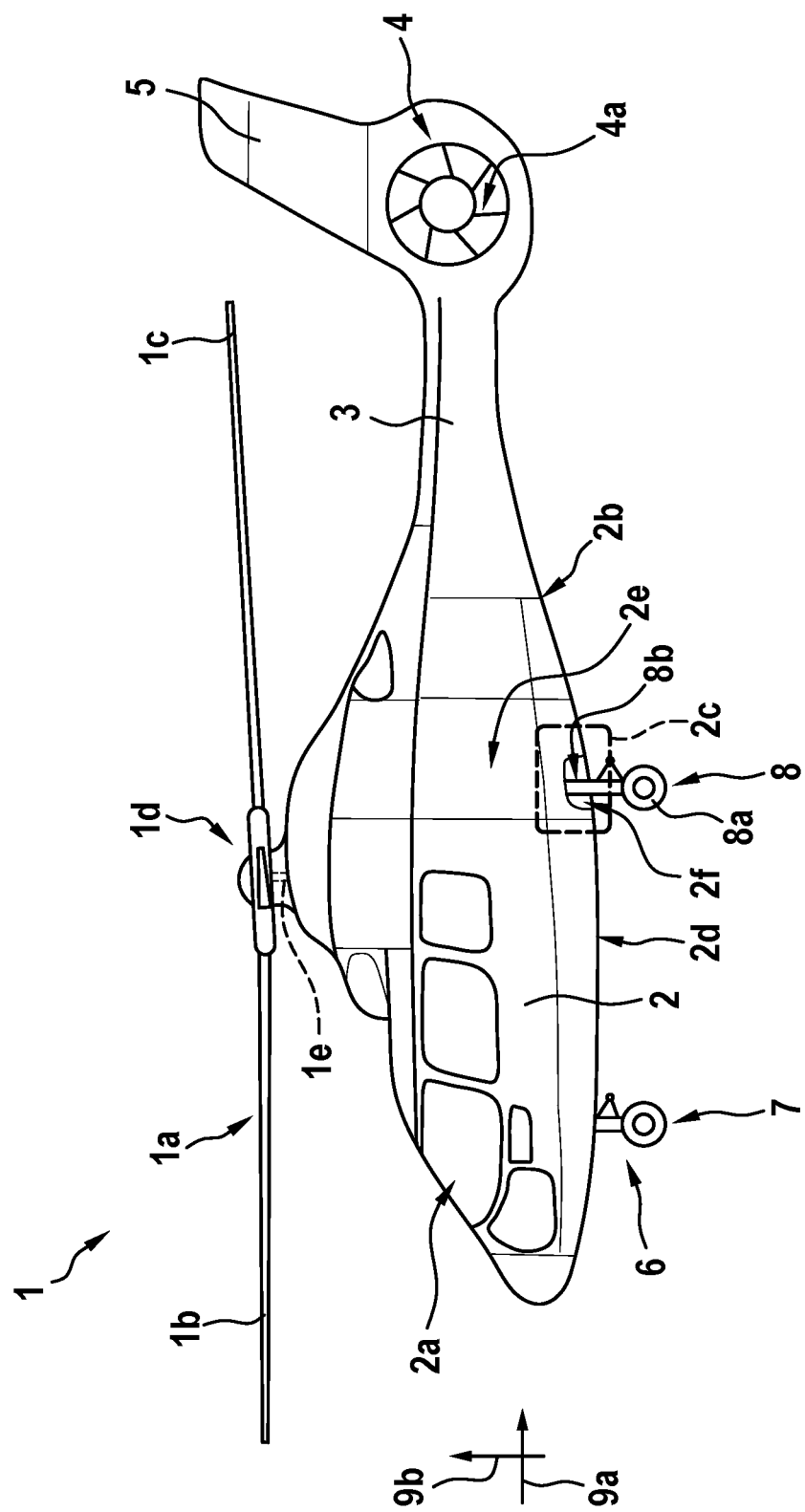
FIG. 1 shows a lateral view of a rotorcraft with at least one non-retractable wheel-type landing gear.

FIG. 1 shows a rotorcraft 1 that is exemplarily illustrated as a helicopter. Thus, for purposes of simplicity and clarity, the rotorcraft 1 is hereinafter referred to as the "helicopter 1".

Illustratively, the helicopter 1 comprises at least one main rotor 1a for providing lift and forward or backward thrust during operation. By way of example, the at least one main rotor 1a is embodied as a multi-blade main rotor that comprises a plurality of rotor blades 1b, 1c which are mounted at an associated rotor head 1d to a rotor shaft 1e, which rotates in operation of the helicopter 1 around an associated rotor axis.

The helicopter 1 further comprises a fuselage 2 on top of which the at least one main rotor 1a is located. Illustratively, the fuselage 2 forms a cabin 2a with a cabin floor (17 e.g., in FIG. 2), and a rear fuselage 2b. The fuselage 2 extends in a longitudinal direction 9a that corresponds the three-dimensional space to an x-axis, a vertical direction 9b that corresponds in the three-dimensional space to a z-axis, and a transverse direction (9c e.g., in FIG. 2) that corresponds in the three-dimensional space to a y-axis. The fuselage 2 is connected at the rear fuselage 2b to a tail boom 3. By way of example, the helicopter 1 further comprises at least one preferentially shrouded counter-torque device 4 which is located on the tail boom 3 and configured to provide counter-torque during operation, i.e., to counter the torque created by rotation of the at least one main rotor 1a for purposes of balancing the helicopter 1 in terms of yaw. The at least one counter-torque device 4 is illustratively provided at an aft section of the tail boom 3 and preferably comprises a tail rotor 4a. The aft section of the tail boom 3 preferably further comprises a fin 5.

More specifically, the fuselage 2 comprises at least a lower shell 2d, a side shell 2e, and at least one lateral longeron (18 e.g., in FIG. 4) which together delimit at least one lower lateral fuselage compartment 2c with an opening 2f through which the at least one lower lateral fuselage compartment 2c is accessible. The lower shell 2d is connected to the side shell 2e and encases together with the latter the cabin floor (17 e.g., in FIG. 2).

Illustratively, the fuselage 2 is connected to a wheel-type landing gear 6 that comprises at least one fixed, i.e., non-retractable wheel-type landing gear 8 rigidly attached in the at least one lower lateral fuselage compartment 2c and extending at least partly through the opening 2f. The at least one fixed, i.e., non-retractable wheel-type landing gear 8 comprises at least one wheel 8a, illustratively a single wheel, and a shock absorber 8b connected to the wheel 8a.

By way of example, the wheel-type landing gear 6 has a tricycle-type layout in which the at least one non-retractable wheel-type landing gear 8 implements two similarly constructed rear main landing gears. Thus, the at least one non-retractable wheel-type landing gear 8 is also referred to hereinafter as "the main landing gear 8" and described in more detail with respect to only one of the two similarly constructed rear main landing gears, for simplicity and brevity. Illustratively, the wheel-type landing gear 6 with the tricycle-type layout further comprises a single fixed, i.e., non-retractable nose landing gear 7.

Figure 2:
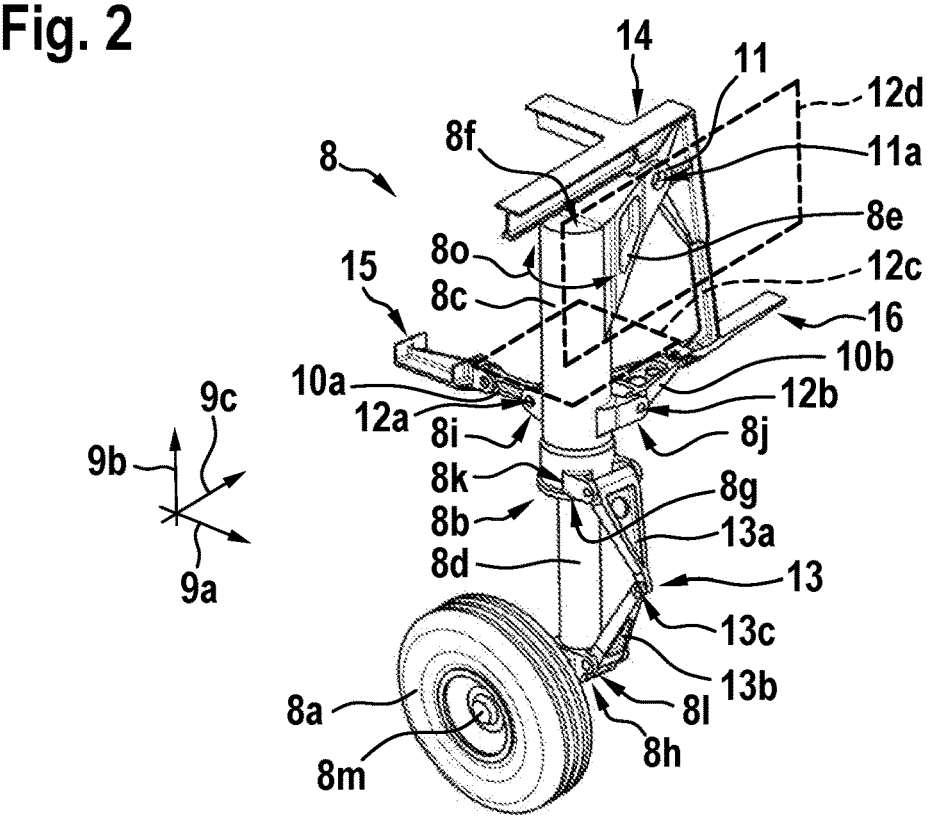
FIG. 2 shows a perspective view of the at least one non-retractable wheel-type landing gear of FIG. 1 with a shock absorber in extended state, seen from an outer rear side.

FIG. 2 shows the main landing gear 8 of FIG. 1 with the single wheel 8a and the shock absorber 8b, as well as a portion of a main hinge fitting 14 provided on the fuselage 2 of FIG. 1 to which the shock absorber 8b is mounted. Furthermore, the longitudinal direction 9a, the vertical direction 9b, as well as a transverse direction 9c of the fuselage 2 of FIG. 1 are indicated and applied in analogy to the nose landing gear 8.

As described above at FIG. 1, the shock absorber 8b is connected to the single wheel 8a. More specifically, the shock absorber 8b has a circumferential direction 8o and comprises a shock absorber tube 8c as well as a shock absorber rod 8d telescopically mounted to the shock absorber tube 8c. Illustratively, the shock absorber tube 8c comprises an upper end 8f and an axially opposed lower end 8g. The lower end 8g is an open end via which the shock absorber rod 8d is introduced into the shock absorber tube 8c. The shock absorber rod 8d may also be referred to as a shock absorber cylinder.

According to an illustrative realization, the shock absorber tube 8c may be linked via a torque link 13 to the shock absorber rod 8d. The torque link 13 may comprise an upper torque arm 13a pivotally mounted to a torque link fixation 8k provided on the shock absorber tube 8c close to the lower end 8g of the shock absorber tube 8c. The torque link 13 may further comprise a lower torque arm 13b pivotally mounted to the upper torque arm 13a at an associated hinged connection 13c. The lower torque arm 13b may further be mounted to a torque link fixation 8l provided on the shock absorber rod 8d close to a lower end 8h of the shock absorber rod 8d. Moreover, the torque link fixation 8l and/or the lower end 8h of the shock absorber rod 8d may be connected to a wheel axle 8m of the wheel 8a.

The shock absorber tube 8c is adapted for attachment to the main hinge fitting 14 provided in the transverse direction 9c on the fuselage 2 of FIG. 1. Illustratively, the shock absorber tube 8c is mounted in the region of its upper end 8f to the main hinge fitting 14 via a mounting arm 8e. The mounting arm 8e extends laterally in the transverse direction 9c from the shock absorber tube 8c toward the main hinge fitting 14 and is integrally formed with the shock absorber tube 8c. Preferably, the mounting arm 8e is rigidly attachable, and illustratively attached, via a single hinge 11 to a single attachment point (11b e.g., in FIG. 4) provided on the main hinge fitting 14. The single hinge 11 forms preferably a single hinge axis 11a that is at least approximately arranged perpendicular to the mounting arm 8e.

Furthermore, the shock absorber tube 8c is adapted for attachment to a link fitting 15 provided in the longitudinal direction 9a on the fuselage 2 of FIG. 1. Illustratively, a first link fixation 8i extends laterally from the shock absorber tube 8c in the longitudinal direction 9a toward the link fitting 15. The link fixation 8i is arranged in the circumferential direction 8o of the shock absorber 8b at an angle in a range from 45° to 120° with respect to the mounting arm 8e, by way of example at an angle of 90°. Preferably, the link fixation 8i is integrally formed with the shock absorber tube 8c and provided for attachment to a linear link component adapted for linking the shock absorber tube 8c to the link fitting 15.

The link fixation 8i is illustratively attached to a linear link component 10a linking the shock absorber tube 8c to the link fitting 15. The linear link component 10a preferably extends in the longitudinal direction 9a, i.e., along the x-axis, and is, therefore, also referred to as "the X-link 10a". Similarly, the link fitting 15 is preferably arranged along the X-link 10a in the longitudinal direction 9a, i.e., along the x-axis, and, therefore, also referred to as "the X-link fitting 15". The X-link 10a is illustratively hingedly mounted to the link fixation 8i at a X-link hinge axis 12a. Similarly, the X-link 10a is also hingedly mounted to the X-link fitting 15.

Furthermore, the shock absorber tube 8c is adapted for attachment to a link fitting 16 provided in the transverse direction 9c on the fuselage 2 of FIG. 1. Illustratively, a second link fixation 8j extends laterally from the shock absorber tube 8c in the transverse direction 9c toward the link fitting 16. The link fixation 8j is arranged in the circumferential direction 8o of the shock absorber 8b at an angle in a range from 45° to 120° with respect to the link fixation 8i, by way of example at an angle of 90°. Preferably, the link fixation 8j is integrally formed with the shock absorber tube 8c and provided for attachment to a triangular link component adapted for linking the shock absorber tube 8c to the link fitting 16.

The link fixation 8j is illustratively attached to a triangular link component 10b linking the shock absorber tube 8c to the link fitting 16. The triangular link component 10b preferably extends in the transverse direction 9c, i.e., along the y-axis, and is, therefore, also referred to as "the Y-link 10b". Similarly, the link fitting 16 is preferably arranged along the Y-link 10b in the transverse direction 9c, i.e., along the y-axis, and, therefore, also referred to as "the Y-link fitting 16". The Y-link 10b is illustratively hingedly mounted to the link fixation 8j at a Y-link hinge axis 12b. Preferably, the hinge axis 12b is at least approximately arranged perpendicular to the mounting arm 8e. Accordingly, the hinge axis 12b and the single hinge axis 11a are at least approximately arranged in parallel. Furthermore, the Y-link 10b is hingedly mounted to the Y-link fitting 16.

Illustratively, the link fixations 8i, 8j span a horizontal plane 12c which is shown in dashed lines. The horizontal plane 12c is preferably positioned at an angle (22 in FIG. 4) in a range from 80° to 100° with respect to the shock absorber 8b, by way of example at an angle of 90°. Still illustratively, the link fixation 8j and the mounting arm 8e span a vertical plane 12d which is also shown in dashed lines. Preferably, the vertical plane 12d is oriented at least approximately perpendicular to the horizontal plane 12c.

Figure 3:
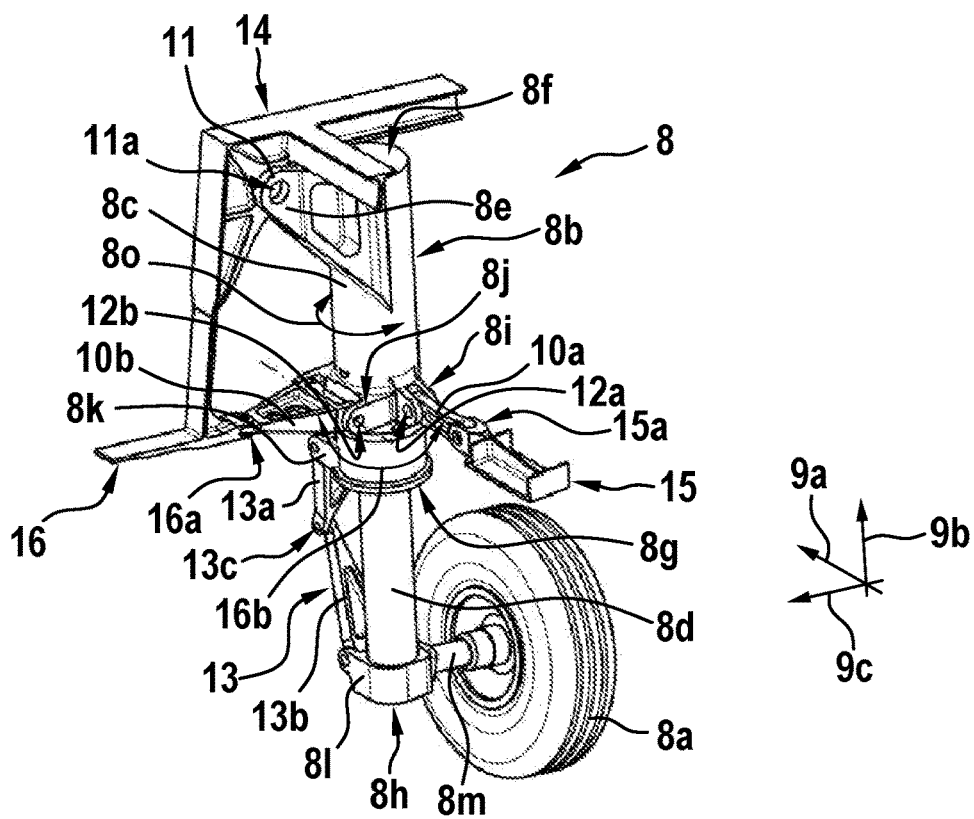
FIG. 3 shows a perspective view of the at least one non-retractable wheel-type landing gear of FIG. 2, seen from an inner front side.

FIG. 3 shows the main landing gear 8 with the single wheel 8a and the shock absorber 8b of FIG. 2 together with the main hinge fitting 14, the X-link fitting 15, and the Y-link fitting 16 of FIG. 2. Similar to FIG. 2, the longitudinal direction 9a, the vertical direction 9b, as well as the transverse direction 9c are indicated.

As described above at FIG. 2, the shock absorber 8b with the circumferential direction 8o comprises the shock absorber tube 8c and the shock absorber rod 8d telescopically mounted to the shock absorber tube 8c. The mounting arm 8e extends laterally from the shock absorber tube 8c in the transverse direction 9c and is mounted to the main hinge fitting 14 at the main hinge 11 that forms preferably a single hinge axis 11a which is at least approximately arranged perpendicular to the mounting arm 8e. The link fixation 8i extends laterally from the shock absorber tube 8c in the longitudinal direction 9a and the 10a X-link is illustratively hingedly mounted to the link fixation 8i at the X-link hinge axis 12a. The link fixation 8j extends laterally from the shock absorber tube 8c in the transverse direction 9c and the Y-link 10b is illustratively hingedly mounted to the link fixation 8j at the Y-link hinge axis 12b. The Y-link 10b is further hingedly mounted to the Y-link fitting 16.

In addition, FIG. 3 illustrates an angle 16b formed in the circumferential direction 8o of the shock absorber 8b between the link fixations 8i, 8j, i.e., between the X-link 10a and the Y-link 10b. The angle 16b is preferably in a range from 45° to 120° and amounts by way of example to approximately 90°.

Furthermore, the X-link 10a is illustratively hingedly mounted to the X-link fitting 15 at an associated fuselage or airframe fixation point 15a. The latter forms a fuselage-side X-link hinge axis.

Similarly, the Y-link 10b is hingedly mounted to the Y-link fitting 16 at an associated fuselage or airframe fixation point 16a. The latter forms a fuselage-side Y-link hinge axis.

Illustratively, the X-link 10a and the Y-link 10b, i.e., the link fixations 8i, 8j, are provided close to the open end 8g of the shock absorber tube 8c. The mounting arm 8e is illustratively provided close to the closed end 8f of the shock absorber tube 8c.

Figure 4:
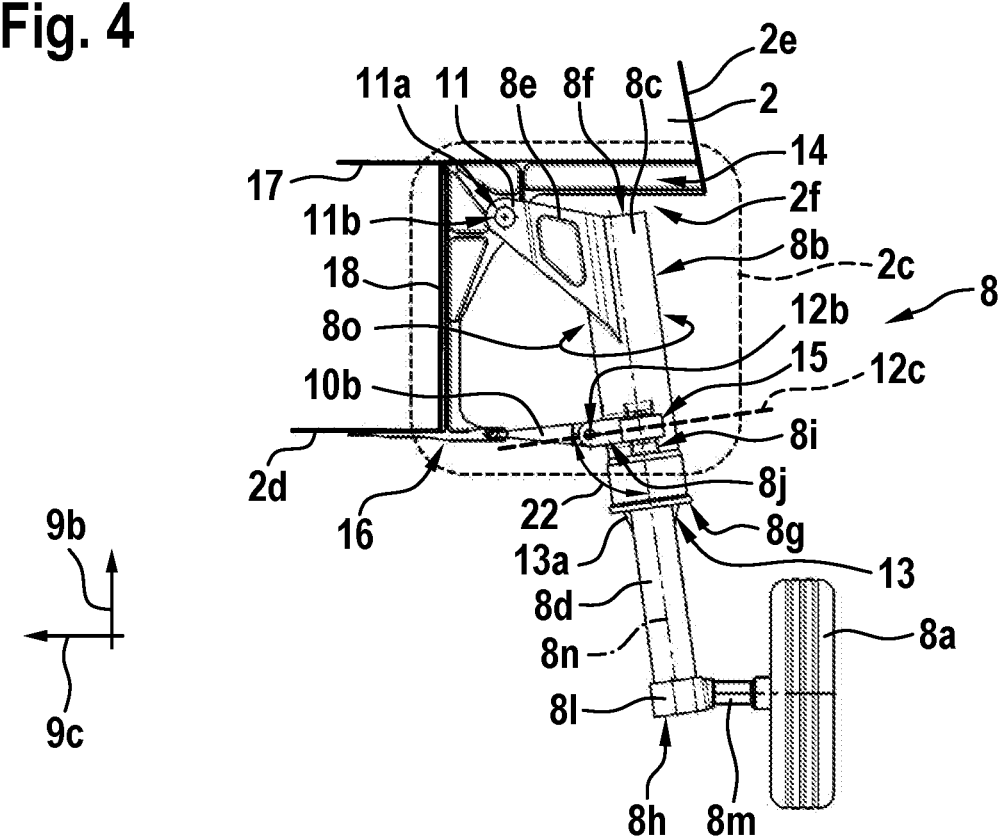
FIG. 4 shows a front view of the at least one non-retractable wheel-type landing gear of FIG. 3.

FIG. 4 shows the main landing gear 8 with the single wheel 8a and the shock absorber 8b of FIG. 2 and FIG. 3 which is illustratively mounted to the fuselage 2 of the rotorcraft 1 of FIG. 1. The shock absorber 8b is shown in extended state, e.g., during flight of the rotorcraft 1 of FIG. 1. The shock absorber 8b comprises the mounting arm 8e and the link fixations 8i, 8j. Furthermore, the fuselage 2 of the rotorcraft 1 of FIG. 1 is shown with the main hinge fitting 14, the X-link fitting 15, and the Y-link fitting 16 of FIG. 2 and FIG. 3. The fuselage 2 is further shown according to FIG. 1 with the lower shell 2d, the side shell 2e, and the at least one lower lateral fuselage compartment 2c with the opening 2f. Moreover, similar to FIG. 2 and FIG. 3 the vertical direction 9b and the transverse direction 9c are indicated.

Illustratively, the fuselage 2 further comprises at least one lateral longeron 18 which delimits together with the lower shell 2d and the side shell 2e the at least one lower lateral fuselage compartment 2c with the opening 2f through which the at least one lower lateral fuselage compartment 2c is accessible. The lower shell 2d is connected to the side shell 2e and encases together with the latter a cabin floor 17. The main hinge fitting 14 is mounted to the cabin floor 17 and the at least one lateral longeron 18. The at least one lateral longeron 18 preferably extends at least approximately in the longitudinal direction 9a of FIG. 2 and FIG. 3.

As described above at FIG. 2 and FIG. 3, the shock absorber 8b with the circumferential direction 8o comprises the shock absorber tube 8c and the shock absorber rod 8d telescopically mounted to the shock absorber tube 8c. The mounting arm 8e extends laterally from the shock absorber tube 8c in the transverse direction 9c and is mounted to the main hinge fitting 14 at the main hinge 11 that forms preferably the single hinge axis 11a that is at least approximately arranged perpendicular to the mounting arm 8e. The link fixation 8*j* extends laterally from the shock absorber tube 8*c* in the transverse direction 9*c* and the Y-link 10*b* is illustratively hingedly mounted to the link fixation 8*j* at the Y-link hinge axis 12*b*. The Y-link 10*b* is further hingedly mounted to the Y-link fitting 16.

Illustratively, the main hinge 11 that forms the single hinge axis 11*a* defines a single attachment point 11*b* for the mounting arm 8*e*. Furthermore, the Y-link 10*b* is illustratively arranged tangentially to the lower shell 2*d*. Preferably, the Y-link fitting 16 is rigidly attached to the lower shell 2*d*. This applies preferably likewise to the X-link 10*a* of FIG. 2 and FIG. 3 which is, thus, preferably also arranged tangentially to the lower shell 2*d*, whereas the X-link fitting 15 is preferably also rigidly attached to the lower shell 2*d*. Moreover, a length axis 8*n* of the shock absorber 8*b* is illustratively positioned at an angle 22 in a range from 80° to 100°, by way of example 90°, with respect to the horizontal plane 12*c* of FIG. 2, which is spanned by the link fixations 8*i*, 8*j*.

Figure 5:
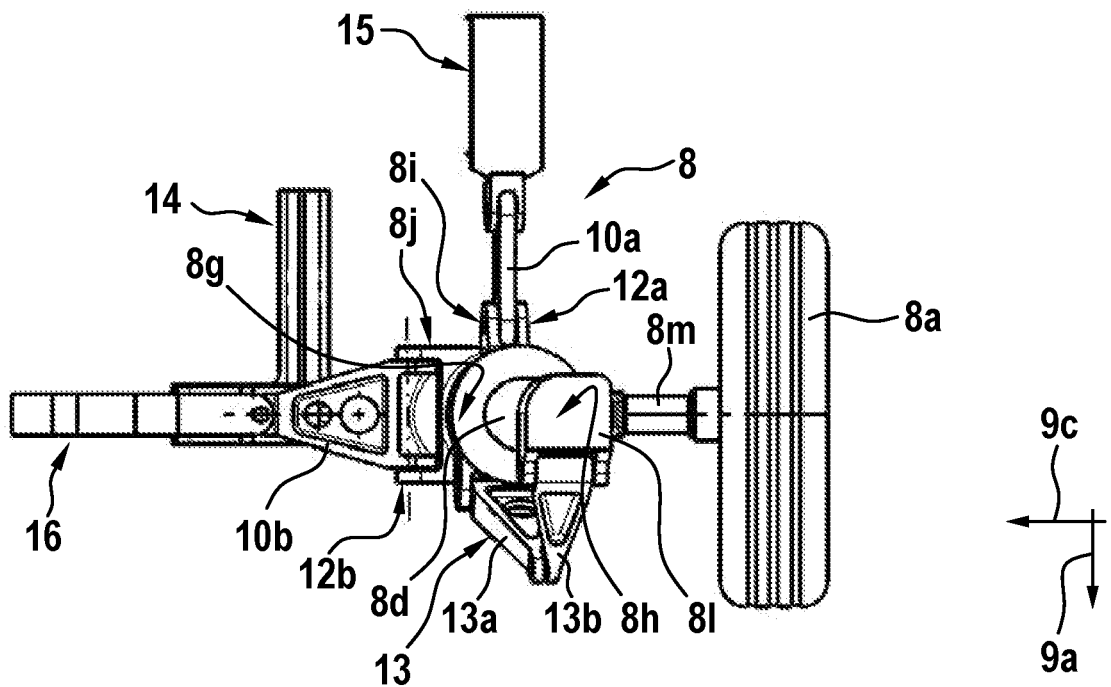
FIG. 5 shows a bottom view of the at least one non-retractable wheel-type landing gear of FIG. 1 to FIG. 4.

FIG. 5 shows the main landing gear 8 with the single wheel 8*a* and the shock absorber 8*b* of FIG. 2 to FIG. 4 together with the main hinge fitting 14, the X-link fitting 15, and the Y-link fitting 16 of FIG. 2 to FIG. 4. The shock absorber 8*b* comprises the mounting arm 8*e* and the link fixations 8*i*, 8*j*. Moreover, similar to FIG. 2 and FIG. 3 the longitudinal direction 9*a* and the transverse direction 9*c* are indicated.

As described above at FIG. 2 and FIG. 3, the X-link 10*a* is hingedly mounted to the link fixation 8*i* at the X-link hinge axis 12*a*. Furthermore, the Y-link 10*b* is hingedly mounted to the link fixation 8*j* at the Y-link hinge axis 12*b*. FIG. 5 further illustrates the linear shape of the X-link 10*a* and the triangular shape of the Y-link 10*b*. The triangular shape of the Y-link 10*b* allows to transfer two independent load components into the fuselage 2 of FIG. 1.

Figure 6:
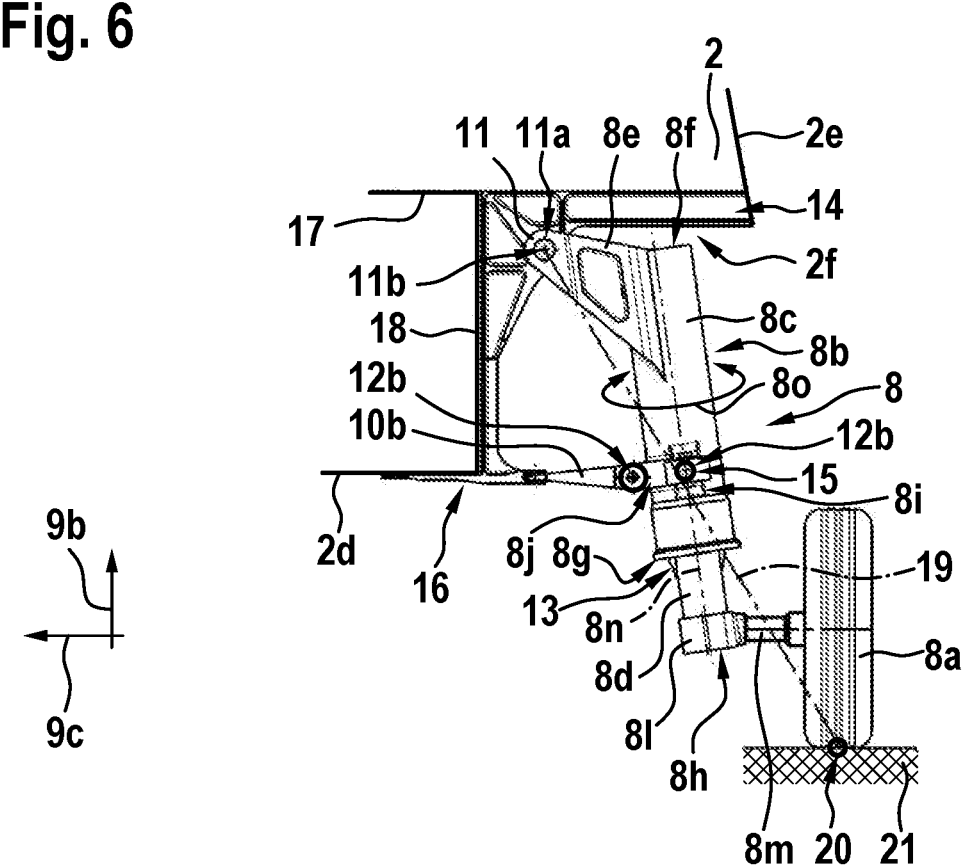
FIG. 6 shows the front view of the at least one non-retractable wheel-type landing gear of FIG. 4 with the shock absorber in compressed state.

FIG. 6 shows the main landing gear 8 with the single wheel 8*a* and the shock absorber 8*b* of FIG. 2 to FIG. 4 which is illustratively mounted to the fuselage 2 of the rotorcraft 1 of FIG. 1, as described above at FIG. 4. However, in contrast to FIG. 4 the shock absorber 8*b* is now shown in compressed state, e.g., during or after landing of the rotorcraft 1 of FIG. 1 on ground 21, where the single wheel 8*a* forms a ground contact point 20.

As described above at FIG. 4, the shock absorber 8*b* comprises the mounting arm 8*e* and the link fixations 8*i*, 8*j*. The link fixation 8*j* is hingedly mounted to the Y-link 10*b*. The mounting arm 8*e* is mounted to the main hinge fitting 14 at the main hinge 11.

Preferably, the main hinge 11, the link fixation 8*i* and the ground contact point 20 are at least approximately aligned on a virtual connecting line 19. Thus, no torque needs to be transferred from the main landing gear 8 to the fuselage 2 and a respective transverse load of the Y-link 10*b* is advantageously reduced to a minimum.

It should be noted that modifications to the above described embodiments are within the common knowledge of the person skilled in the art and, thus, also considered as being part of the present disclosure. For instance, although the at least one non-retractable wheel-type landing gear is only described in the context of a main landing gear in FIG. 2 to FIG. 6, the configuration and structure thereof may likewise be applied to the nose landing gear 7 of FIG. 1. It should further be noted that in the context of the present description the term "non-retractable wheel-type landing gear" refers to a fixed landing gear which is statically and rigidly mounted to the fuselage of a rotorcraft and which may not be entirely or even partially be retracted into an associated storage compartment during flight operation of the rotorcraft.

REFERENCE LIST 1 rotorcraft
1*a* multi-blade main rotor
1*b*, 1*c* rotor blades
1*d* rotor head
1*e* rotor shaft
2 fuselage
2*a* cabin
2*b* rear fuselage
2*c* lower lateral fuselage compartment
2*d* fuselage lower shell
2*e* fuselage side shell
2*f* compartment opening
3 tail boom
4 counter-torque device
4*a* tail rotor
5 fin
6 wheel-type landing gear
7 non-retractable nose landing gear
8 non-retractable main landing gear
8*a* wheel
8*b* shock absorber
8*c* shock absorber tube
8*d* shock absorber rod
8*e* shock absorber mounting arm
8*f* shock absorber tube upper end
8*g* shock absorber tube lower end
8*h* shock absorber rod lower end
8*i* shock absorber tube X-link fixation
8*j* shock absorber tube Y-link fixation
8*k* shock absorber tube torque link fixation
8*l* shock absorber rod torque link fixation
8*m* wheel axle
8*n* shock absorber length axis
8*o* shock absorber circumferential direction
9*a* longitudinal direction
9*b* vertical direction
9*c* transverse direction
10*a* X-link
10*b* Y-link
11 main hinge
11*a* main hinge axis
11*b* single attachment point
12*a* X-link hinge axis
12*b* Y-link hinge axis
12*c* Plane spanned by X-link and Y-link
12*d* Plane spanned by main hinge and shock absorber tube
13 torque link
13*a* upper torque link component
13*b* lower torque link component
13*c* torque link hinged connection
14 airframe main hinge fitting
15 airframe X-link fitting
15*a* airframe X-link fixation point
16 airframe Y-link fitting
16*a* airframe Y-link fixation point
16*b* angle
17 cabin floor
18 longeron
19 virtual connecting line
20 ground contact point
21 ground
22 angle

What is claimed is:

1. A rotorcraft comprising:
a fuselage forming a cabin with a cabin floor, the fuselage comprising a lower shell, a side shell, and at least one lateral longeron which together delimit at least one lower lateral fuselage compartment with an opening; and
at least one non-retractable wheel-type landing gear rigidly attached in the at least one lower lateral fuselage compartment and extending at least partly through the opening, the at least one non-retractable wheel-type landing gear comprising:
at least one wheel;
a shock absorber with a length axis and a circumferential direction, the shock absorber being connected to the at least one wheel and comprising:
a shock absorber tube, and
a shock absorber rod telescopically mounted to the shock absorber tube;
a mounting arm extending laterally from the shock absorber tube, the mounting arm being integrally formed with the shock absorber tube and rigidly attached to a first fitting mounted to the cabin floor and the at least one lateral longeron; and
a link fixation extending laterally from the shock absorber tube, the link fixation being arranged in the circumferential direction of the shock absorber at an angle in a range from 45° to 120° with respect to the mounting arm and rigidly attached via a linear link component to a second fitting mounted to the lower shell of the rotorcraft.

2. The rotorcraft of claim 1,
wherein the at least one non-retractable wheel-type landing gear further comprises an other link fixation extending laterally from the shock absorber tube, the other link fixation being arranged in the circumferential direction of the shock absorber at an angle in a range from 45° to 120° with respect to the link fixation and rigidly attached via a triangular link component to a third fitting mounted to the lower shell of the rotorcraft.

3. The rotorcraft of claim 2,
wherein the triangular link component is arranged tangentially to the lower shell.

4. The rotorcraft of claim 2,
wherein the linear link component is arranged tangentially to the lower shell.

5. The rotorcraft of claim 1,
wherein the link fixation is integrally formed with the shock absorber tube and provided for attachment to the linear link component adapted for linking the shock absorber tube to the second fitting of the rotorcraft.

6. The rotorcraft of claim 2,
wherein the other link fixation is integrally formed with the shock absorber tube and provided for attachment to the triangular link component adapted for linking the shock absorber tube to the third fitting of the rotorcraft.

7. The rotorcraft of claim 2,
wherein the link fixation and the other link fixation span in a horizontal plane that is positioned at an angle in a range from 80° to 100° with respect to the length axis of the shock absorber.

8. The rotorcraft of claim 7,
wherein the mounting arm and the other link fixation span in a vertical plane that is oriented at least approximately perpendicular to the horizontal plane.

9. The rotorcraft of claim 1,
wherein the shock absorber tube comprises a closed end and an axially opposed open end, wherein the mounting arm is provided close to the closed end, and wherein the link fixation is provided close to the open end.

10. The rotorcraft of claim 2,
wherein the shock absorber tube comprises a closed end and an axially opposed open end, wherein the mounting arm is provided close to the closed end, and wherein the link fixation and the other link fixation are provided close to the open end.

11. The rotorcraft of claim 2,
wherein the other link fixation forms a hinge axis that is at least approximately arranged perpendicular to the mounting arm.

12. The rotorcraft of claim 11,
wherein the mounting arm is rigidly attachable via a single hinge to a single attachment point provided on the first fitting of the rotorcraft, and wherein the single hinge forms a single hinge axis that is at least approximately arranged perpendicular to the mounting arm.

13. The rotorcraft of claim 12,
wherein the hinge axis and the single hinge axis are at least approximately arranged in parallel.

14. A rotorcraft comprising:
a fuselage with a cabin with a cabin floor, the fuselage comprising a lower shell, a side shell, and a longeron which together delimit a lower lateral fuselage compartment with an opening; and
a non-retractable wheel landing gear attached in the lower lateral fuselage compartment and extending at least partly through the opening, the non-retractable wheel landing gear comprising:
a wheel;
a shock absorber with a length axis and a circumferential direction, the shock absorber being connected to the wheel and comprising:
a shock absorber tube, and
a shock absorber rod telescopically mounted to the shock absorber tube;
a mounting arm extending from the shock absorber tube, the mounting arm attached to a first fitting mounted to the cabin floor and the longeron; and
a link fixation extending from the shock absorber tube, the link fixation being arranged in the circumferential direction of the shock absorber at an angle in a range from 45° to 120° with respect to the mounting arm and attached via a linear link component to a second fitting mounted to the lower shell of the rotorcraft.

15. The rotorcraft of claim 14,
wherein the non-retractable wheel landing gear further comprises an other link fixation extending from the shock absorber tube, the other link fixation being arranged in the circumferential direction of the shock absorber at an angle in a range from 45° to 120° with respect to the link fixation and attached via a triangular link component to a third fitting mounted to the lower shell of the rotorcraft.

16. The rotorcraft of claim 15,
wherein at least one of the triangular link component and the linear link component is arranged tangentially to the lower shell.

17. The rotorcraft of claim 14,
wherein the link fixation is integrally formed with the shock absorber tube and provided for attachment to the linear link component adapted for linking the shock absorber tube to the second fitting of the rotorcraft.

18. The rotorcraft of claim 15,
wherein the other link fixation is integrally formed with the shock absorber tube and provided for attachment to the triangular link component adapted for linking the shock absorber tube to the third fitting of the rotorcraft.

19. The rotorcraft of claim 15,
wherein the link fixation and the other link fixation span in a horizontal plane that is positioned at an angle in a range from 80° to 100° with respect to the length axis of the shock absorber, and wherein the mounting arm and the other link fixation span in a vertical plane that is oriented approximately perpendicular to the horizontal plane.

20. The rotorcraft of claim 14,
wherein the shock absorber tube comprises a closed end and an axially opposed open end, wherein the mounting arm is provided close to the closed end, and wherein the link fixation is provided close to the open end.

\* \* \* \* \*